United States Patent
Louie et al.

(10) Patent No.: US 10,585,925 B2
(45) Date of Patent: *Mar. 10, 2020

(54) FACILITATING MANAGEMENT OF USER QUERIES AND DYNAMIC FILTRATION OF RESPONSES BASED ON GROUP FILTERS IN AN ON-DEMAND SERVICES ENVIRONMENT

(71) Applicant: salesforce.com, inc., San Francisco, CA (US)

(72) Inventors: Arthur Albert Louie, Vancouver (CA); Christopher Douglas Seymour, San Francisco, CA (US); Ethan Treber, Seattle, WA (US); Jason Schroeder, Los Angeles, CA (US); Jean Elie Bovet, Los Angeles, CA (US); Jody Elizabeth Bleyle, Portland, OR (US); John Christopher Houston, Superior, CO (US); Kamyar Seradjfar, Castro Valley, CA (US); Mohamad Arabo, Kirkland, WA (US); Qingqing Liu, Dublin, CA (US); Thomas Archie Cook, Jr., Boulder, CO (US)

(73) Assignee: salesforce.com, inc., San Francisco ( * ) Notice: Subject to any disclaimer, the term of this patent is extended or adjusted under 35 U.S.C. 154(b) by 0 days.

This patent is subject to a terminal disclaimer.

(21) Appl. No.: 15/866,843

(22) Filed: Jan. 10, 2018

(65) Prior Publication Data

US 2018/0129737 A1    May 10, 2018

Related U.S. Application Data

(63) Continuation of application No. 14/318,136, filed on Jun. 27, 2014, now Pat. No. 9,881,076.

(Continued)

(51) Int. Cl.
  G06F 7/00    (2006.01)
  G06F 17/30    (2006.01)
  G06F 16/335    (2019.01)

(52) U.S. Cl.
  CPC ................. *G06F 16/335* (2019.01)

(58) Field of Classification Search
  CPC .... G06F 16/335; G06F 16/2423; G06F 16/93; G06F 17/30; G06F 17/30699;
  (Continued)

(56) References Cited

U.S. PATENT DOCUMENTS 5,577,188 A    11/1996 Zhu
5,608,872 A    3/1997 Schwartz et al.
(Continued)

OTHER PUBLICATIONS

Final Office Action for U.S. Appl. No. 14/318,136 dated Nov. 1, 2016, 12 pages.
(Continued)

*Primary Examiner* — Azam M Cheema
(74) *Attorney, Agent, or Firm* — Jaffrey, Watson, Mendonsa & Hamilton, LLP

(57) ABSTRACT

In accordance with embodiments, there are provided mechanisms and methods for facilitating management of user queries and dynamic filtration of responses based on group filters in an on-demand services environment in a multi-tenant environment according to one embodiment. In one embodiment and by way of example, a method includes receiving, at a first computing device, a query via an application programming interface ("API") of a software application at a second computing device, where the query includes one or more filter parameters including a size filter parameter. The method may further include evaluating the query based on the one or more filter parameters including the size filter parameter, selecting a first response based on the size filter parameter, and communicating the first response to be viewed via the API at the second computing device.

18 Claims, 7 Drawing Sheets

Related U.S. Application Data

(60) Provisional application No. 61/856,888, filed on Jul. 22, 2013.

(58) Field of Classification Search
CPC ............. G06F 17/2205; G06F 17/2264; G06F 17/2241; G06F 3/048
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,881,076 B2 * | 1/2018 | Louie ................ G06F 17/30699 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0094138 A1 | 4/2009 | Sweitzer et al. |
| 2009/0177744 A1 | 7/2009 | Marlow et al. |
| 2010/0145936 A1 * | 6/2010 | Grinstein ............. G06F 3/0486 707/724 |
| 2011/0276920 A1 * | 11/2011 | Fong ................. G06F 17/30392 715/810 |
| 2012/0054060 A1 | 3/2012 | Kundu |
| 2013/0067364 A1 | 3/2013 | Berntson et al. |
| 2014/0058833 A1 | 2/2014 | Ouimet et al. |
| 2014/0101556 A1 | 4/2014 | Pinard |
| 2014/0372412 A1 * | 12/2014 | Humphrey ........ G06F 17/30979 707/722 |

OTHER PUBLICATIONS

Non-Final Office Action for U.S. Appl. No. 14/318,136 dated May 24, 2016, 19 pages.

Notice of Allowance for U.S. Appl. No. 14/318,136 dated Sep. 27, 2017, 13 pages.

\* cited by examiner

FACILITATING MANAGEMENT OF USER QUERIES AND DYNAMIC FILTRATION OF RESPONSES BASED ON GROUP FILTERS IN AN ON-DEMAND SERVICES ENVIRONMENT

CLAIM OF PRIORITY

This application claims the benefit of and priority to U.S. application Ser. No. 14/318,136, filed Jun. 27, 2014, entitled "Facilitating Management Of User Queries And Dynamic Filtration Of Responses Based On Group Filters In An On-Demand Services Environment" which claims the benefit of and priority to U.S. Provisional Patent Application No. 61/856,888, entitled "Filtering Response Bodies Based on Group Filter" by Arthur Albert Louie, et al., filed Jul. 22, 2013, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating management of user queries and dynamic filtration of responses based on group filters in an on-demand services environment.

BACKGROUND

Often user queries placed through collaboration application-based application programming interfaces ("APIs") receive responses that are much bigger in size than typically desired by or useful to the user placing the query. Such responses are unfiltered and include large amounts of irrelevant data which leads to inefficiency and waste of human and system resources, such as time, storage, power, etc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
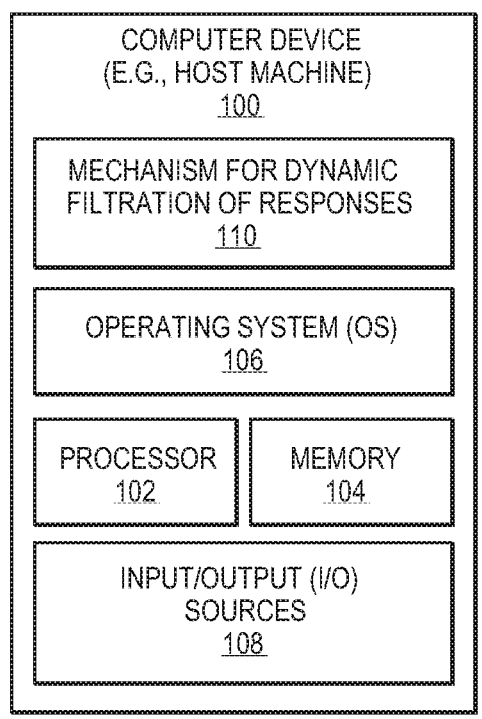
FIG. 1 illustrates a computing device employing a mechanism for dynamic filtration of responses according to one embodiment.

In accordance with embodiments, there are provided mechanisms and methods for facilitating management of user queries and dynamic filtration of responses based on group filters in an on-demand services environment in a multi-tenant environment according to one embodiment. In one embodiment and by way of example, a method includes receiving, at a first computing device, a query via an application programming interface ("API") of a software application at a second computing device, where the query includes one or more filter parameters including a size filter parameter. The method may further include evaluating the query based on the one or more filter parameters including the size filter parameter, selecting a first response based on the size filter parameter, and communicating the first response to be viewed via the API at the second computing device. Embodiments will be further described and explained throughout this document.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating management of user queries and dynamic filtration of responses based on group filters in an on-demand services environment in a multi-tenant environment according to one embodiment. In one embodiment and by way of example, a method includes receiving, at a first computing device, a query via an application programming interface ("API") of a software application at a second computing device, where the query includes one or more filter parameters including a size filter parameter. The method may further include evaluating the query based on the one or more filter parameters including the size filter parameter, selecting a first response based on the size filter parameter, and communicating the first response to be viewed via the API at the second computing device. Embodiments will be further described and explained throughout this document.

Embodiments are provided for facilitation of communication of data via collaboration/communication applications (e.g., Chatter®) and their corresponding APIs (e.g., ConnectAPI™ (also referred to as "Connect API"), ChatterAPI™ (also referred to as "Chatter API"), etc.) and generation and communication of intelligently-filtered response bodies (or simply "responses") to caller/user-placed queries in a multi-tenant environment. For example, to facilitate smaller and tighter responses for communication via an API, such as Chatter API, a number of aliases or filter group query parameters (also referred to as "filter groups", "filterGroup", or simply "filter parameters"), such as size or value filter parameter, inclusion filter parameter, exclusion filter parameter, etc., may be provided and applied for various representations (of queries and responses) being communicated within the system, such as Chatter®. Further, for example, data properties in various representations may be tagged with a size filter parameter (such as big, medium, small, etc.) to request and obtain the response of a corresponding size (such as big response, medium response, small response, etc.). Further, in one embodiment, one or more filter parameters (e.g., size filter parameter, inclusion filter parameter, exclusion filter parameter, etc.) may be associated with or included in the user's query/request that may be placed as or via a Uniform Resource Locator ("URL"), where only the properties included in the provided size may be serialized back to the user at a client computing device.

Although Chatter API and Connect API are referenced throughout this document, it is contemplated that embodiments are not limited to any particular API and that they may apply to any number and type of other APIs and other forms of communications through various APIs. Similarly, Chatter® is referenced through this document as a communication system or collaboration software application for implementing the embodiments described herein, but it is contemplated that embodiments are not limited to Chatter® and that they may apply to any number and type of other collaboration, networking, and communication applications or systems. Similarly, it is contemplated that filter groups may affect any number and type of Hypertext Transfer Protocol ("HTTP") methods, such as HEAD, POST, etc., and not just GET which is used in this document as an example for the sake of brevity and ease of understanding.

For example, it is contemplated that not every query placed by a user requires a big response that is unfiltered having some or most of the details that may not be relevant to the query or desired by the user placing the query. A query or sub-query may be placed in any number of ways, such as via a URL. In one embodiment, using filter parameters, a response may be reduced from being big to medium or small to appropriately correspond to the query. For example, each property in a response body may be tagged with a size parameter, such as big, medium, small, etc., such that, in one embodiment, when a query URL includes a filter query parameter, only the properties included in the specified size (e.g., big, medium, small, etc.) are serialized back to the user at a client computing device.

It is contemplated that although the document primarily describes three sizes or values, such as big, medium, and small, etc., relating to the corresponding filter parameters, in some embodiments, more or fewer data properties be used in responses using the corresponding inclusion and/or exclusion parameters, as will be subsequently described in this document. Further, for example, using the three filter values, the filter group may include: 1) a big size filter parameter to request a big response that is complete and unfiltered in that it includes, for example, all the medium and small properties and may be regarded as the default response size; 2) a medium size filter parameter to request a medium response may include, for example, small data properties and more but less than the data properties of a big response; and 3) a small size filter parameter to request a small response that includes, for example, bare minimum of relevant or essential details; and 4) inclusion and/or exclusion filter parameters to further customize the aforementioned responses by including and/or excluding data properties in addition to the pre-determined data properties for their corresponding size.

It is contemplated that embodiments and their implementations are not merely limited to a multi-tenant database system ("MTDBS") and can be used in other environments, such as a client-server system, a software-based system, a mobile device, a personal computer (PC), a web services environment, etc. However, for the sake of brevity and clarity, throughout this document, embodiments are described with respect to a multi-tenant database system, such as Salesforce.com®, which is to be regarded as an example of an on-demand environment.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a mechanism for dynamic filtration of responses 110 according to one embodiment. In one embodiment, computing device 100 serves as a host machine for employing mechanism for dynamic filtration of responses 110 ("filtration mechanism") 110 for facilitating management of user queries and dynamic filtration of responses based on group filters in a multi-tiered, multi-tenant, on-demand services environment. As aforementioned, the described subject matter and its implementations are not limited to a multi-tenant database system and that they may be used with various environments or contexts, such as a client-server system, a software-based system, a mobile device, a personal computer (PC), a web services environment, etc.

The term "user" or "caller" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of mechanism 110 or an organization's representative, such as a salesperson, a sales manager, a product manager, an accountant, a director, an owner, a president, a computer programmer, an information technology (IT) representative, etc.

It is to be noted that any references to data and/or metadata (e.g., Customer Relationship Model ("CRM") data and/or metadata, such as Salesforce CRM™, etc.), tables (e.g., custom object table, unified index tables, description tables, etc.), computing devices (e.g., server computers, desktop computers, mobile computers, such as tablet computers, smartphones, etc.), platforms, software development languages, applications, and/or development tools or kits (e.g., Force.com®, Force.com Apex™ code, JavaScript, jQuery™, Developerforce®, Visualforce®, Service Cloud Console Integration Toolkit™ ("Integration Toolkit" or "Toolkit"), Platform on a Service™ (PaaS), Chatter® Groups, Chatter.com®, Salesforce Chatter™, Chatterbox™, Sprint Planner®, MS Project®, etc.), domains (e.g., Google®, Facebook®, LinkedIn®, Skype®, etc.), formats and APIs (e.g., ConnectAPI™, Chatterconnect™, ChatterAPI™, Chatter REST API™ ("Chatter REST", "REST API", or simply "REST"), Chatter in Apex™, JavaScript Object Notation® (JSON®), etc.), etc., discussed throughout this document are merely used as examples for brevity, clarity, and ease of understanding and that embodiments are not limited to any particular number or type of data, metadata, tables, computing devices, techniques, programming languages, software applications, software development tools/kits, formats, APIs, etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion® Limited, now known and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™ systems, etc.), e-readers (e.g., Kindle® by Amazon.com®, Nook® by Barnes and Nobles®, etc.), Global Positioning System (GPS)-based navigation systems, media players, cable setup boxes, smart televisions and platforms, wearable devices (e.g., jewelry, clothing items, watches, bracelets, smartcards, etc.), etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "query", "request", "command", "job", "input", and "message" may be used interchangeably throughout this document.

Figure 2:
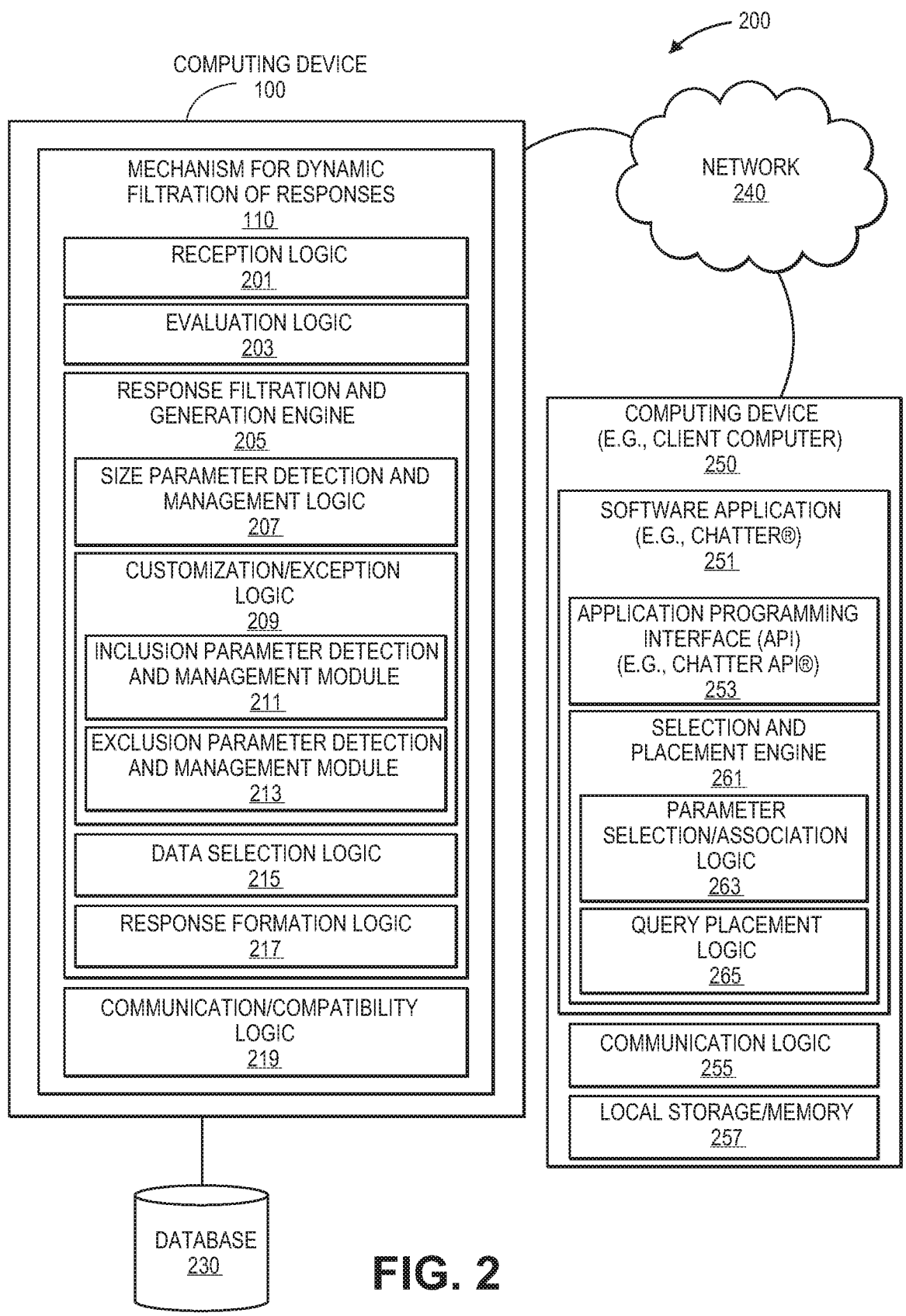
FIG. 2 illustrates a mechanism for dynamic filtration of responses according to one embodiment.

FIG. 2 illustrates a mechanism for dynamic filtration of responses 110 according to one embodiment. In one embodiment, filtration mechanism 110 may include a number of components, such as: reception logic 201, evaluation logic 203, response filtration and generation engine 205 including size parameter detection and management logic ("size parameter logic") 207, data selection logic 215, response formation logic 217, and customization/exception logic 209 including inclusion parameter detection and management module ("inclusion parameter module") 211 and exclusion parameter detection and management module ("exclusion parameter module") 213; and communication/compatibility logic 219.

Embodiments provide for dynamic filtration of responses to queries where the filtration may be performed by requesting a reduction in the size of the response (such as by associating a size parameter relating to big, medium, small, etc.) and/or specifying any number and type of data properties to be included into or excluded from the response which may be performed in addition to or instead of requesting the size variation of the response. In one embodiment, any number and type of factors may be considered and subsequently pre-defined by software developers, system administrators, etc., to define the amount and type of data properties (also referred to as simply "data" or "content") that are to be included in or excluded from a response of a particular size based on a size filter parameter, inclusion filter parameter, and/or exclusion filter parameter.

For example, a big or large response to a query may remain unfiltered and thus include all or nearly all of the available data properties which may be appropriate for situations when such large number of data properties is desired by the user. However, in most cases, user may require a relatively smaller number of data properties in responses to, for example, be efficient while saving invaluable human and/or system resources (e.g., time, labor, power, memory, etc.). For instance, in many cases, data properties like nicknames, middle names, facsimile ("fax") numbers, etc., may not be needed because, for example, although a person's nickname may have an identifying use, it may have little or no use in a query response and may even be proactively avoided in professional communications. Similarly, with the increase in communication options, such as emails, Short Message Service ("SMS")-based messages (also referred to as "texts"), collaboration software applications (e.g., Chatter®, etc.), social/business networking software applications (e.g., LinkedIn®, Facebook®, Twitter®, etc.), communication software applications (e.g., Skype®, Tango®, Viber®, etc.), or the like, conventional fax numbers may not carry the same level of important and thus, they can be removed from smaller responses, such as medium and/or small responses, to make the smaller responses tighter and more efficient without having to compromise any of the important and/or relevant content.

Accordingly, considering the aforementioned example relating to nicknames and faxes, in some embodiments, the pre-defined factors taken into consideration by a software developer may include (but not limited to) common sense factors (such as exclude nicknames, etc.), current technology options/uses (such as exclude fax numbers, etc.), past queries or historical query/response data relating to particular users, queries, and/or organizations or customers (such as include product names, sales associates' names, monthly sales data, but remove sales associates' titles and middle names, etc.), systems resources (such as dynamically improvise a response based on available time, memory, etc.), and any number and type of other factors which may be fixed or dynamic and as desired and/or necessitated.

In one embodiment, filtration mechanism 110 may be employed by a server computing device serving as a host machine, such as computing device 100, in communication with one or more databases, such as database 230, one or more other computing devices, such as computing device 250 serving as a client computing device, over one or more networks, such as network 240 (e.g., cloud network, Internet, intranet, etc.). In one embodiment, computing device 250 may include: software application 251 (e.g., Salesforce Chatter® or Chatter.com®) facilitating user interface 253 (e.g., ChatterAPI®, ConnectAPI®, etc.); communication logic 255; and local storage/memory 257 which may be in communication with one or more local databases or remote databases, such as database 230 over network 240, such as a cloud computing network. In one embodiment, software application 251 may host selection and placement engine 261 including parameter selection/association logic 263 and query placement logic 265.

Throughout this document, "logic", "component", "module", "framework", "element", and "engine" may be referenced interchangeably and include, by way of example, software, hardware, and/or any combination of software and hardware, such as firmware. Further, any use of a particular brand, word, or term, such as "big", "medium", "small", "inclusion", "exclusion", "Salesforce Chatter", "API", "Chatter API", "Connect API", "REST API", "filter group", "filterGroup", "JSON", "query parameters", etc., should not be read to limit embodiments to software or devices that carry that label in products or in literature external to this document.

In one embodiment and as aforementioned, Chatter API or Connect API, etc., may be used to perform various tasks of filtration mechanism 110 as described throughout this document. For example, a user may form and place a query via selection and placement engine 261 at client computing device 250 (e.g., mobile computing device, such as a smartphone, a tablet computer, etc.). In one embodiment, the user may select a desired size parameter, such as medium, and associate the size parameter to a query via selection/association logic 263 which is then placed via query placement logic 265 and API 253 at client computing device 250. Once the query having the size parameter is placed by the user, it is communicated between computing devices 100, 200 via communication logic 255 and communication/compatibility logic 219 over network 240.

In one embodiment, the query is received at filtration mechanism 110 via reception logic 201. Upon receiving the query, it is then evaluated by evaluation logic 203. At evaluation logic 203, the query may be evaluated and analyzed for any number of factors, such as (but not limited to) whether the query is associated with one or more filter parameters, such as a size filter parameter (e.g., filter groups of small, medium, big, etc.), one or more inclusion/exclusion filter parameters, etc. For example, if the query is placed as a default query, such as without having any filter parameters, it may be forwarded on to data selection logic 215 to select the unfiltered default data and then on to response formation logic 217 of response generation engine 205 to form a big (default) response which is then transmitted, via communication compatibility logic 219 and communication logic 255, to be displayed at a display device via API 253 at client computing device 250 (e.g., mobile computing device, such as a smartphone, a tablet computer, etc.).

Continuing with the above example, in one embodiment, if one or more filter parameters (such as a size filter parameter (e.g., medium), an inclusion and/or exclusion parameter, etc.) are determined by evaluation logic 203 to be associated with the query, the query is then forwarded on to size parameter logic 207 for detection and management of any size parameters that may be included in the query. For example, size parameter logic 207 may first detect whether there is a size parameter (e.g., medium) associated with the query and upon detecting the size parameter, it may manage the query by tagging it for the detected size parameter and notifying data selection logic 215 for selecting the appropriate amount of content or data properties for the response in accordance with the size parameter associated with the query. For example, if the detected size parameter is for a medium response, size parameter logic 207 notifies data selection logic 215 of the detected size parameter being medium, where upon receiving the notification, data selection logic 215 selects a medium response. In the absence of any inclusion and/or exclusion parameters, as determined by evaluation logic 203, the selected response (e.g., medium response) may be formed and finalized by response formation logic 217 which is then communicated back to client computing device 250 via communication/compatibility logic 219 and communication logic 255 over network 240. The communicated response may then be viewed by the user via a display device/screen, via API 253, of or in communication with client computing device 250 (e.g., mobile computing device, such as a smartphone, a tablet computer, etc.).

However, in one embodiment, before the selected response (e.g., medium response) may be finalized and communicated back to the user, the query may be forwarded on to customization/exception logic 209 for further processing if one or more of inclusion parameters and/or exclusion parameters are determined by evaluation logic 203 to be included in or associated with the query. In one embodiment, one or more inclusion parameter may be used for adding one or more data properties to the selected response, where one or more exclusion parameters may be used for removing one or more properties that are typically included in the selected response. For example, if the selected response (e.g., medium response) does not include a particular data property (e.g., fax numbers) which is desired or necessitated by the user, the user may request that data property to be included in the selected response by selecting an inclusion filter parameter corresponding to that particular data property (such as, in this example, fax numbers) and associating the inclusion filter parameter with the original query as facilitated by parameter selection/association logic 263.

Similarly, for example and in one embodiment, if the selected response (e.g., middle response) typically includes a particular data property (e.g., middle names) which is not desired or necessitated by the user, the user may request that data property to be excluded from the selected response by selecting an exclusion filter parameter corresponding to that particular data property (such as, in this example, middle names) and associating the exclusion filter parameter with the original query as facilitated by parameter selection/association logic 263.

Accordingly, in some embodiments, a selected response may be further customized by having one or more data properties added to and/or removed from the selected response. Stated differently, one or more data property inclusions may mean a selected small response and a selected medium response may be customized into a small-plus response and a medium-plus response, respectively. Similarly, one or more data property exclusions may mean a selected small response, a selected medium response, and a selected large response may be customized into a small-minus response, a medium-minus response, and a large-minus response, respectively.

Continuing with the example, the user requests a medium response (having associated a medium size filter parameter to the query) and further requests that the fax numbers be included and middle names be excluded from the requested response (having associated an inclusion filter parameter and an exclusion filter parameter). In one embodiment, inclusion parameter module 211 facilitates inclusion of the to-be-included data properties (e.g., fax numbers) by notifying data selection logic 215 to include the to-be-included data properties into the selected response (e.g., medium response). Upon receiving the notification, data selection logic 215 includes the to-be-included data properties into the selected response. Similarly, in another embodiment, exclusion parameter module 213 facilitates exclusion of the to-be-excluded data properties (e.g., middle names) by notifying data selection logic 215 to exclude the to-be-excluded data properties from the selected response (e.g., medium response). Upon receiving the notification, data selection logic 215 excludes the to-be-excluded data properties from the selected response.

The query is then forwarded on to response formation logic 217 when then forms and generates a final response that is in compliance with all the filter parameters associated with the query, as mentioned above. Once the final response has been generated, it is then communicated to computing device 250 over network 240 via communication/compatibility logic 219 and communication logic 255. The final response may then be displayed via API 253 (e.g., ChatterAPI®) of software application 251 (e.g., Chatter®) via a display device or screen of client computing device 250 (e.g., mobile computing device, such as a smartphone, a tablet computer, etc.). In one embodiment, any contents to be included in the response may be obtained from and stored at database 230 and similarly, at computing device 250, the user may choose to save any of the contents received via the response at local storage/memory 257 and place additional queries via software application 251 over network 240.

Throughout this document, embodiments are described in relation to ChatterAPI® and/or Connect API® being the API associated with Chatter® being the collaborative application, but it is contemplated that embodiments are not limited as such and that the embodiments may be used with any number and type of APIs, forms of communications through those APIs, communication/collaborative applications, and the like. Similarly, it is contemplated that filter parameter may affect any number and type of HTTP methods, such as HEAD, POST, etc., and not just GET which is used in this document as an example for the sake of brevity and ease of understanding. It is further contemplated that embodiments are not merely limited to a particular programming language or data format (including any number and types of open standard formats), such as JSON (as illustrated with referenced to FIG. 3), Extensible Markup Language ("XML"), etc., that use human-readable text to transmit data objects having attribute-value pairs, etc., between a server computer (e.g., computing device 100) and a web application (e.g., software application 251).

Communication/compatibility logic 219 may facilitate the ability to dynamically communicate and stay configured with any number and type of software/application developing tools, models, data processing servers, database platforms and architectures, programming languages and their corresponding platforms, APIs, collaboration applications (e.g., Chatter® or Chatter.com®, etc.), etc. Communication/compatibility logic 225 further facilitates the ability to dynamically communicate and stay configured with various computing devices (e.g., server computing device, mobile computing devices, such as smartphones, tablet computers, laptop, etc.), networks (e.g., cloud network, intranet, the Internet, proximity network, such as Bluetooth®, WiFi®, etc.), websites (e.g., communication/networking websites, such as Facebook®, LinkedIn®, Google+®, Twitter®, etc.), and the like, while ensuring compatibility with changing technologies, parameters, protocols, standards, platforms, development languages, APIs, etc.

It is contemplated that any number and type of components may be added to and/or removed from filtration mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
FIG. 3 illustrates a screenshot showing a software code representing a payload response to a query for facilitating management of user queries and dynamic filtration of responses based on group filters according to one embodiment.

FIG. 3 illustrates a screenshot 300 showing a software code representing a payload response to a query for facilitating management of user queries and dynamic filtration of responses based on group filters according to one embodiment. In one embodiment, the illustrated payload response may be generated in a particular data format, such as JSON, for communication through a collaboration/communication application-based API, such as ChatterAPI®, via filtration mechanism 110 in response to a query placed by a user via software application 261, such as Chatter®, at client computing device 250 of FIG. 2.

For example and in one embodiment, using GET, the illustrated payload response may be generated in response to a query, being placed by a user, as follows: GET/chatter/users/me?filterGroup=Small. Further, as an example, a filterGroup indicated as Big may contain 28 data properties, a filterGroup indicated as Medium may contain 17 data properties, while a filterGroup indicated as Small may contain 13 data properties.

Figure 4:
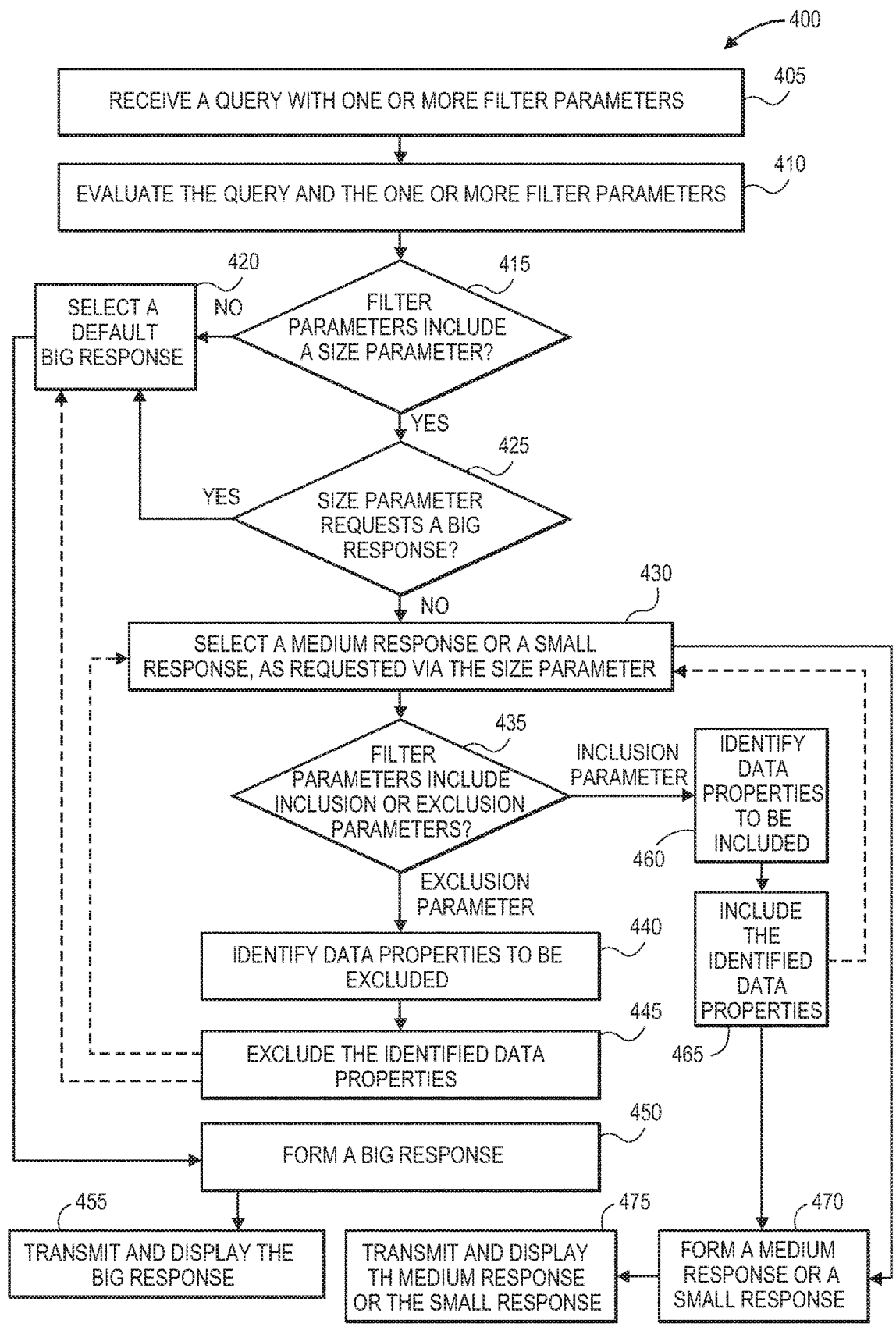
FIG. 4 illustrate a method for facilitating management of user queries and dynamic filtration of responses based on group filters according to one embodiment.

FIG. 4 illustrates a method for facilitating management of user queries and dynamic filtration of responses based on group filters according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by filtration mechanism 110 of FIG. 1. The processes of method 400 are illustrated in linear sequences for brevity and clarity in presentation; however, it is contemplated that any number of them can be performed in parallel, asynchronously, or in different orders.

Method 400 begins at block 405 with receiving with a query having one or more filter parameters. The query may be received at a server computing device and placed by a user via a software application, such as Chatter®, and its API, such as ChatterAPI®, at a client computing device including (but not limited to) a desktop computer, a work station, a laptop computer or another form of a mobile computer, etc., such as a tablet computer, a smartphone, etc., and communicated with the server computing device via a network (e.g., cloud network, Internet, etc.) as illustrated with reference to FIG. 2. At block 410, the received query and its one or more filter parameters may then be evaluated for subsequent processing of the query.

For example and in one embodiment, at block 415, a determination is made as to whether the query's filter parameters include a size filter parameter. If the filter parameters do not include a size filter parameter, the process continues with block 420 where, by default, a big response is selected in response to the query. If, however, the filter parameters include a size filter parameters, the process continues at block 425 where another determination is made as to whether the query's size filter parameter includes a big size filter parameter to request a big response. If yes, the process continues at block 420 where a big response is selected in accordance with the big size filter parameter. If, however, the size filter parameter includes a medium size filter parameter to request a medium response, or a small size filter parameter to request a small response, the process continues at block 430 where the medium response in accordance with the medium size filter parameter, or the small response is selected in accordance with the small size filter parameter, respectively.

In one embodiment, at block 435, a determination is made as to whether the one or more filter parameters include one or more of inclusion filter parameters or one or more exclusion filter parameters. If the filter parameters include one or more exclusion filter parameters to request the exclusion of one or more data properties, at block 440, the one or more data properties to be excluded are identified and, at block 445, the identified one or more data properties are then excluded from the selected response, such as the selected big response of block 420, the selected medium response of block 430, or the selected small response of block 430. At block 450, the big response is formed and transmitted and displayed at block 455.

Referring back to block 435, if the filter parameters include one or more inclusion filter parameters to request the inclusion of one or more data properties, at block 460, the one or more data properties to be included are identified and, at block 465, the identified one or more data properties are then included into the selected response, such as the selected medium response or the selected small response of block 430. At block 470, the medium response or the small response is formed and subsequently transmitted and displayed at block 475.

Figure 5:
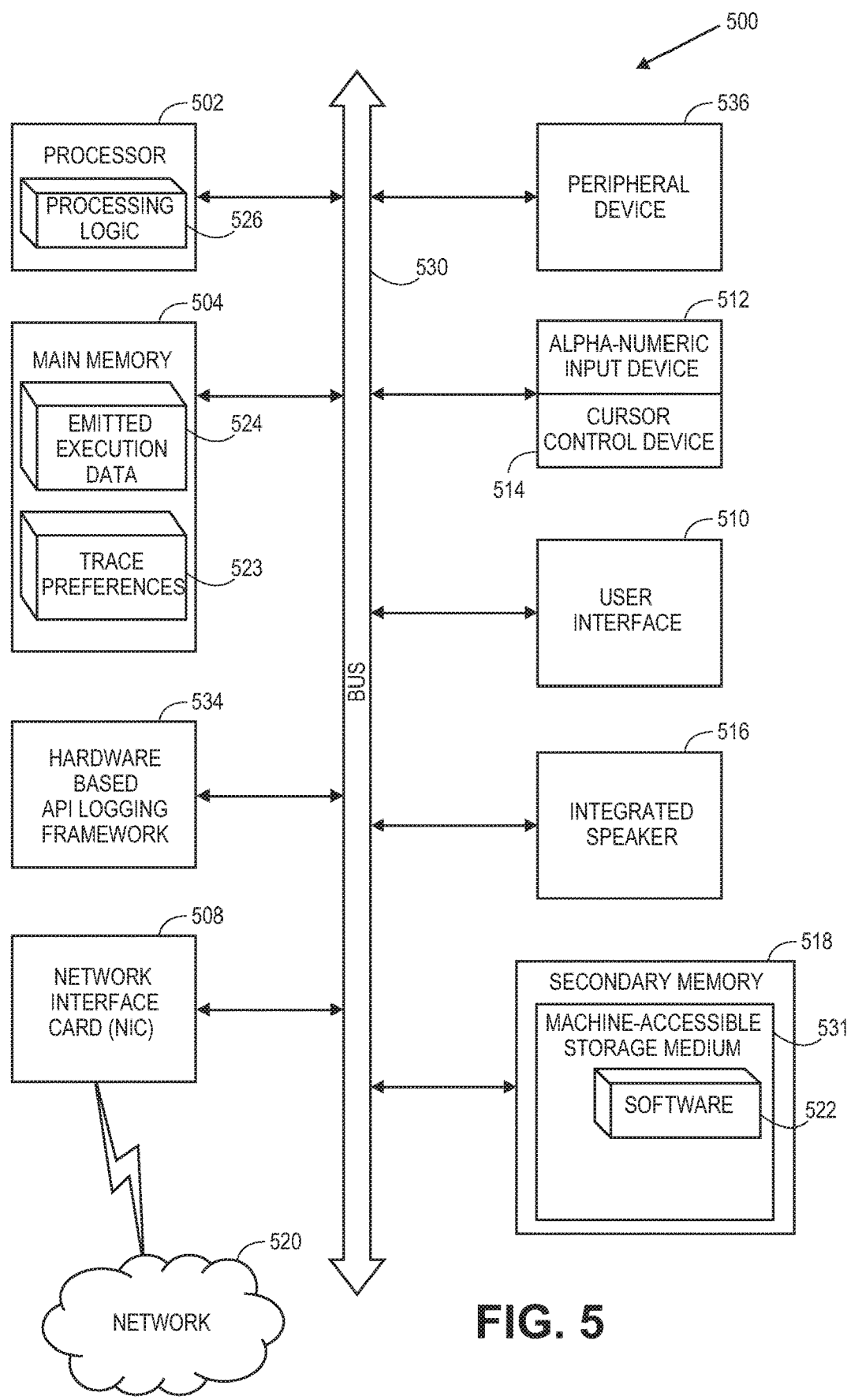
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 100, 250 of FIG. 2, respectively. In alternative embodiments, the machine may be connected (e.g., networked) to other machines in a network (such as host machine 100 of FIG. 1 connected with client machine 250 over network 240 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of filtration mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of filtration mechanism 110 as described with reference to FIG. 1 and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
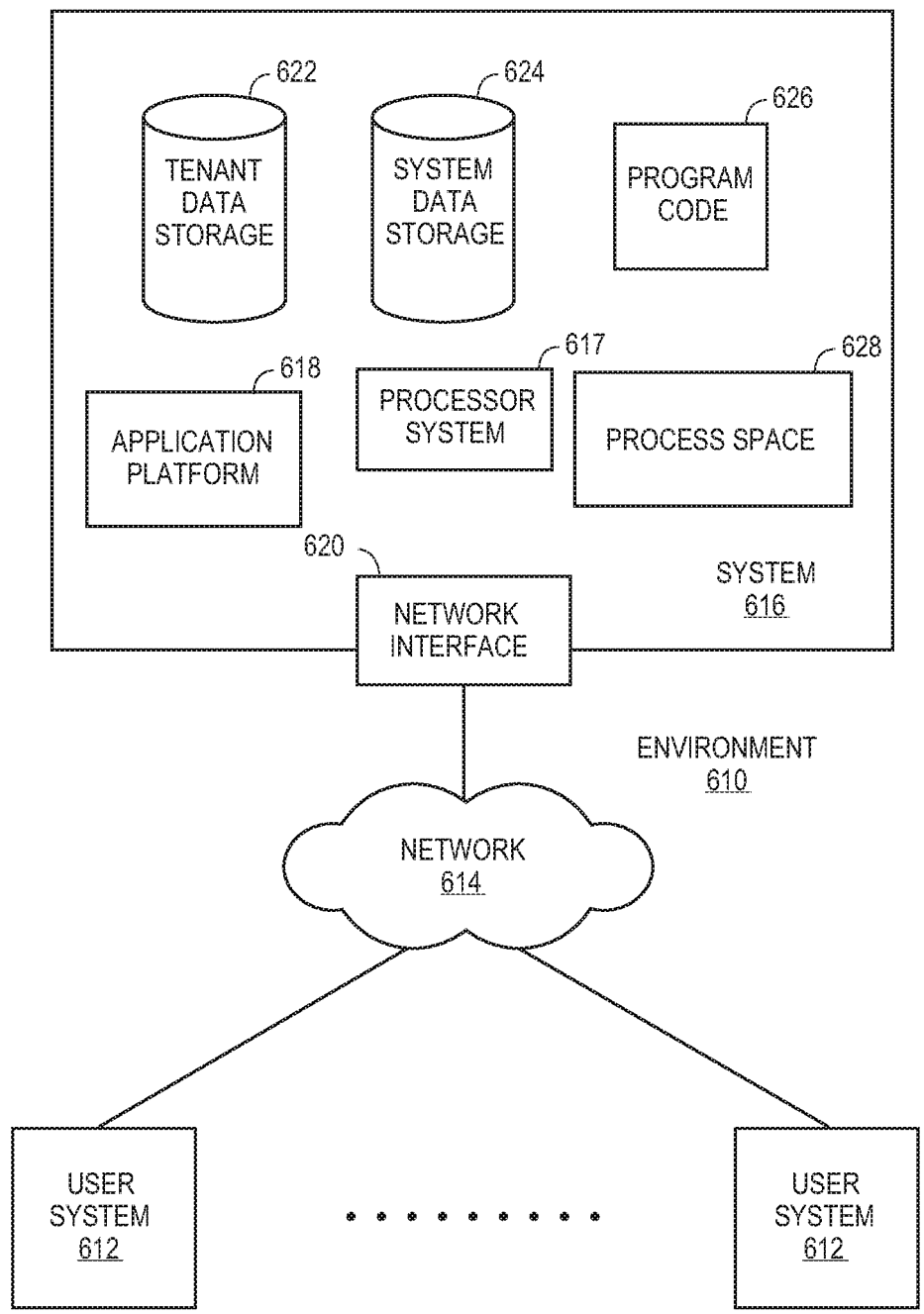
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
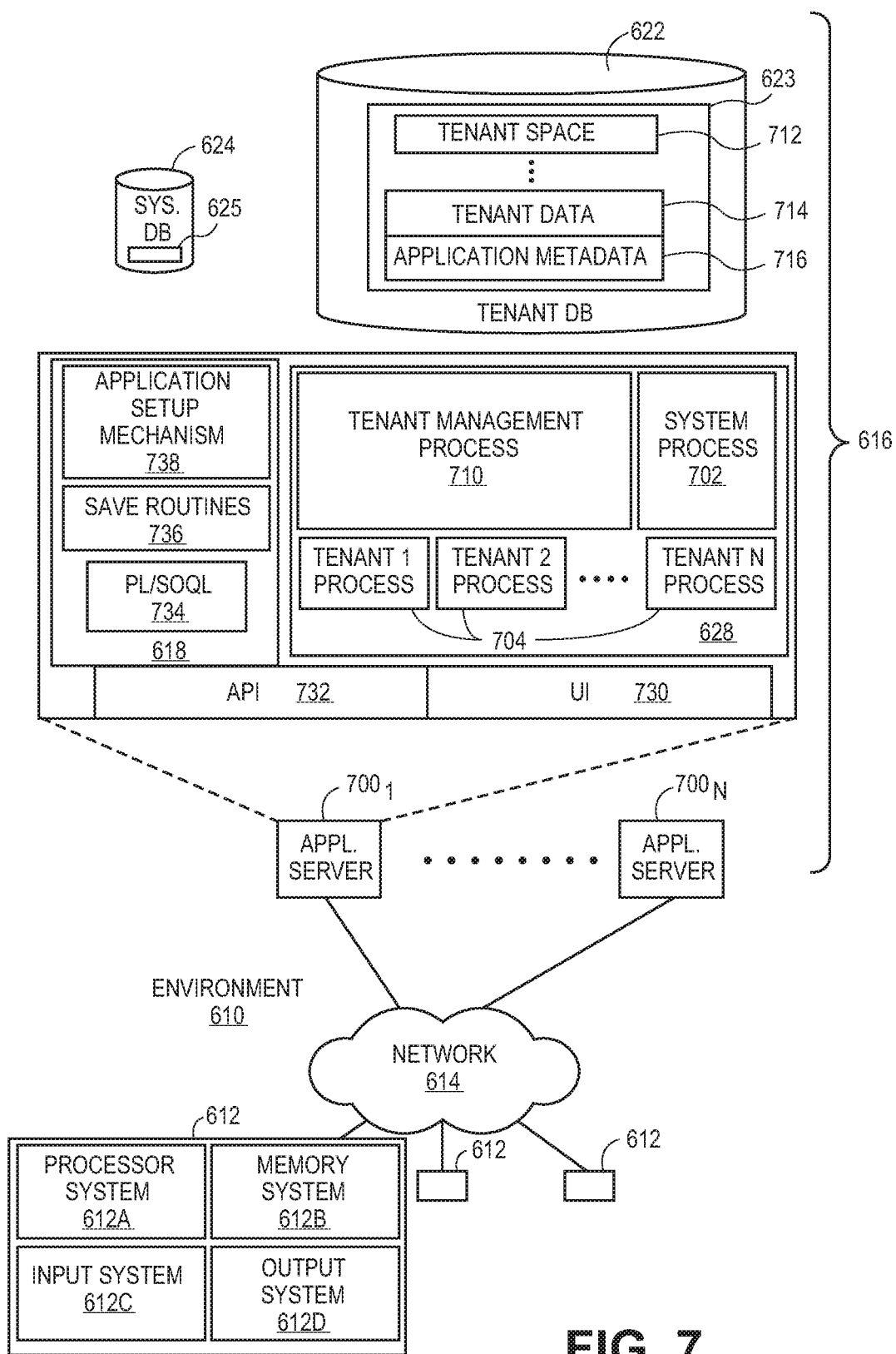
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
evaluating, by a dynamic filtration server computing device in a multi-tenant database environment, a query based on one or more filter parameters including a size filter parameter as defined by inclusion parameters or exclusion parameters associated with a user representing a tenant in a multitenant environment, wherein the query relates to contents associated with a software application accessible at a client computing device;
reviewing, by the dynamic filtration server computing device, the contents for at least one of inclusion in a response and exclusion from the response based on at least one of the inclusion parameters and the exclusion parameters, respectively, wherein the inclusion and exclusion parameters are exclusively defined based on one or more preferences or requirements of the user or the tenant, and wherein the inclusion and exclusion parameters are independent of other inclusion and exclusion parameters exclusive to other users and other tenants;

prior to generating a response, adjusting, by the dynamic filtration server computing device, the contents by at least one of adding first data to the contents as defined by first data properties revealed in the inclusion parameters and removing second data from the contents as defined by second data properties revealed in the exclusion parameters; and generating, by the dynamic filtration server computing device, the response having the adjusted contents such that a size of the response is correspondingly adjusted to small, medium, or large, wherein the response corresponds to and satisfies the one or more preferences or requirements of the user or the tenant.

2. The method of claim 1, further comprising receiving, by the dynamic filtration server computing device, the query from the client computing device over a communication medium including a cloud network, wherein the client computing device is accessible to the user.

3. The method of claim 1, further comprising:
identifying, by the dynamic filtration server computing device, the first data satisfying the first data properties, and the second data satisfying the second data properties; and
communicating, by the dynamic filtration server computing device, the size-adjusted response to the client computing device.

4. The method of claim 1, wherein the size filter parameter comprises at least one of a large-sized filter parameter requesting a large response, a medium-sized filter parameter requesting a medium response, and a small-sized filter parameter requesting a small response.

5. The method of claim 1, wherein the software application comprises a collaboration application offered through a collaboration application-based application programming interface (API).

6. The method of claim 1, further comprising facilitating, by the dynamic filtration server computing device, displaying of the size-adjusted response at the client computing device using a display device and a user interface.

7. A database system comprising:
a dynamic filtration server computing device having a memory to store instructions, and a processing device to execute the instructions to facilitate a mechanism to perform operations comprising:
evaluating a query based on one or more filter parameters including a size filter parameter as defined by inclusion parameters or exclusion parameters associated with a user representing a tenant in a multitenant environment, wherein the query relates to contents associated with a software application accessible at a client computing device;
reviewing the contents for at least one of inclusion in a response and exclusion from the response based on at least one of the inclusion parameters and the exclusion parameters, respectively, wherein the inclusion and exclusion parameters are exclusively defined based on one or more preferences or requirements of the user or the tenant, and wherein the inclusion and exclusion parameters are independent of other inclusion and exclusion parameters exclusive to other users and other tenants;
prior to generating a response, adjusting the contents by at least one of adding first data to the contents as defined by first data properties revealed in the inclusion parameters and removing second data from the contents as defined by second data properties revealed in the exclusion parameters; and
generating the response having the adjusted contents such that a size of the response is correspondingly adjusted to small, medium, or large, wherein the response corresponds to and satisfies the one or more preferences or requirements of the user or the tenant.

8. The system of claim 7, wherein the operations further comprise receiving the query from the client computing device over a communication medium including a cloud network, wherein the client computing device is accessible to the user.

9. The system of claim 7, wherein the operations further comprise:
identifying the first data satisfying the first data properties, and the second data satisfying the second data properties; and
communicating the size-adjusted response to the client computing device.

10. The system of claim 7, wherein the size filter parameter comprises at least one of a large-sized filter parameter requesting a large response, a medium-sized filter parameter requesting a medium response, and a small-sized filter parameter requesting a small response.

11. The system of claim 7, wherein the software application comprises a collaboration application offered through a collaboration application-based application programming interface (API).

12. The system of claim 7, wherein the operations further comprise facilitating displaying of the size-adjusted response at the client computing device using a display device and a user interface.

13. A non-transitory machine-readable medium comprising a plurality of instructions which, when executed by a dynamic filtration server computing device cause the dynamic filtration server computing device to perform operations comprising:
evaluating a query based on one or more filter parameters including a size filter parameter as defined by inclusion parameters or exclusion parameters associated with a user representing a tenant in a multitenant environment, wherein the query relates to contents associated with a software application accessible at a client computing device;
reviewing the contents for at least one of inclusion in a response and exclusion from the response based on at least one of the inclusion parameters and the exclusion parameters, respectively, wherein the inclusion and exclusion parameters are exclusively defined based on one or more preferences or requirements of the user or the tenant, and wherein the inclusion and exclusion parameters are independent of other inclusion and exclusion parameters exclusive to other users and other tenants;
prior to generating a response, adjusting the contents by at least one of adding first data to the contents as defined by first data properties revealed in the inclusion parameters and removing second data from the contents as defined by second data properties revealed in the exclusion parameters; and
generating the response having the adjusted contents such that a size of the response is correspondingly adjusted to small, medium, or large, wherein the response corresponds to and satisfies the one or more preferences or requirements of the user or the tenant.

14. The non-transitory machine-readable medium of claim 13, wherein the operations further comprise receiving the query from the client computing device over a communication medium including a cloud network, wherein the client computing device is accessible to the user.

15. The non-transitory machine-readable medium of claim 13, wherein the operations further comprise:
   identifying the first data satisfying the first data properties, and the second data satisfying the second data properties; and
   communicating the size-adjusted response to the client computing device.

16. The non-transitory machine-readable medium of claim 13, wherein the size filter parameter comprises at least one of a large-sized filter parameter requesting a large response, a medium-sized filter parameter requesting a medium response, and a small-sized filter parameter requesting a small response.

17. The non-transitory machine-readable medium of claim 13, wherein the software application comprises a collaboration application offered through a collaboration application-based application programming interface (API).

18. The non-transitory machine-readable medium of claim 13, wherein the operations further comprise facilitating displaying of the size-adjusted response at the client computing device using a display device and a user interface.

* * * * *